US012620759B2

(12) United States Patent
Sato

(10) Patent No.: US 12,620,759 B2
(45) Date of Patent: May 5, 2026

(54) CONNECTOR WITH RESTRAINED MOVEMENT BETWEEN LOCKING POSITIONS

(71) Applicant: Yazaki Corporation, Tokyo (JP)

(72) Inventor: Tomoya Sato, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 286 days.

(21) Appl. No.: 18/491,340

(22) Filed: Oct. 20, 2023

(65) Prior Publication Data

US 2024/0136769 A1 Apr. 25, 2024
US 2024/0235119 A9 Jul. 11, 2024

(30) Foreign Application Priority Data

Oct. 24, 2022 (JP) ................................ 2022-169707

(51) Int. Cl.
*H01R 13/641* (2006.01)
*H01R 13/627* (2006.01)

(52) U.S. Cl.
CPC ....... *H01R 13/641* (2013.01); *H01R 13/6272* (2013.01)

(58) Field of Classification Search
None
See application file for complete search history.

(56) References Cited

U.S. PATENT DOCUMENTS

2017/0256887 A1* 9/2017 Endo .................... H01R 13/641
2021/0226382 A1 7/2021 Yuk et al.

FOREIGN PATENT DOCUMENTS

CN 108493715 B * 1/2020 ........... H01R 24/005
JP 2017-157454 A 9/2017
JP 2021-118178 A 8/2021
WO WO-2022202244 A1 * 9/2022 ........... H01R 13/641

* cited by examiner

*Primary Examiner* — Tho D Ta
(74) *Attorney, Agent, or Firm* — Sughrue Mion, PLLC

(57) ABSTRACT

A connector includes a housing and a detection member. The housing can be engaged with a mating housing. The detection member is movably mounted to the housing, and detects an engagement state of the mating housing and the housing by moving between a temporary locking position and a final locking position. The housing is provided with a restrained portion. The detection member is provided with a restraining portion that is engaged with the restrained portion in the final locking position of the detection member to restrain a movement to the temporary locking position of the detection member.

4 Claims, 5 Drawing Sheets

CONNECTOR WITH RESTRAINED MOVEMENT BETWEEN LOCKING POSITIONS

CROSS-REFERENCE TO RELATED APPLICATIONS

The present application is based on and claims the benefit of priority from the prior Japanese Patent Application No. 2022-169707, filed on Oct. 24, 2022, the entire contents of which are incorporated by reference herein.

TECHNICAL FIELD

The disclosure relates to a connector.

BACKGROUND

Conventionally, a connector has an inner housing as a housing that can be engaged with an outer housing as a mating housing. Also known are those equipped with a slide member as a detection member that is movably mounted to the inner housing and detects an engagement state of the outer housing and the inner housing by moving between a temporary locking position and a final locking position (see Patent Document 1 (JP 2017-157454 A)).

In this connector, when the outer housing and the inner housing are engaged with each other, the detection member can be moved from the temporary locking position to the final locking position. Due to this, the detection member can detect the engagement state where the outer housing and the inner housing are engaged with each other.

On the other hand, when the outer housing and the inner housing are not engaged with each other, the detection member cannot be moved from the temporary locking position to the final locking position. Due to this, the detection member can detect a semi-engagement state where the outer housing and the inner housing are not engaged with each other.

SUMMARY

By the way, in the connector disclosed in the Patent Document 1, the placement position of the detection member is not maintained with respect to the housing in the final locking position of the detection member. Therefore, under a state where the housing and the mating housing are engaged with each other, if an external force is applied to the detection member, there is a possibility that the detection member moves toward the temporary locking position. The detection member that has moved to the temporary locking position protrudes from the housing. If an external force is applied to the detection member protruding from the housing, there is a possibility that the detection member is damaged.

The disclosure has been made in view of such a conventional problem, and it is an object of the disclosure to provide a connector that can hold a detection member in a final locking position.

A connector in accordance with an aspect includes: a housing that can be engaged with a mating housing; and a detection member that is movably mounted to the housing, and detects an engagement state of the mating housing and the housing by moving between a temporary locking position and a final locking position, wherein the housing is provided with a restrained portion, and the detection member is provided with a restraining portion that is engaged with the restrained portion in the final locking position of the detection member to restrain a movement to the temporary locking position of the detection member.

According to the disclosure, it is possible to provide a connector that can hold a detection member in a final locking position.

DETAILED DESCRIPTION

Figure 1:
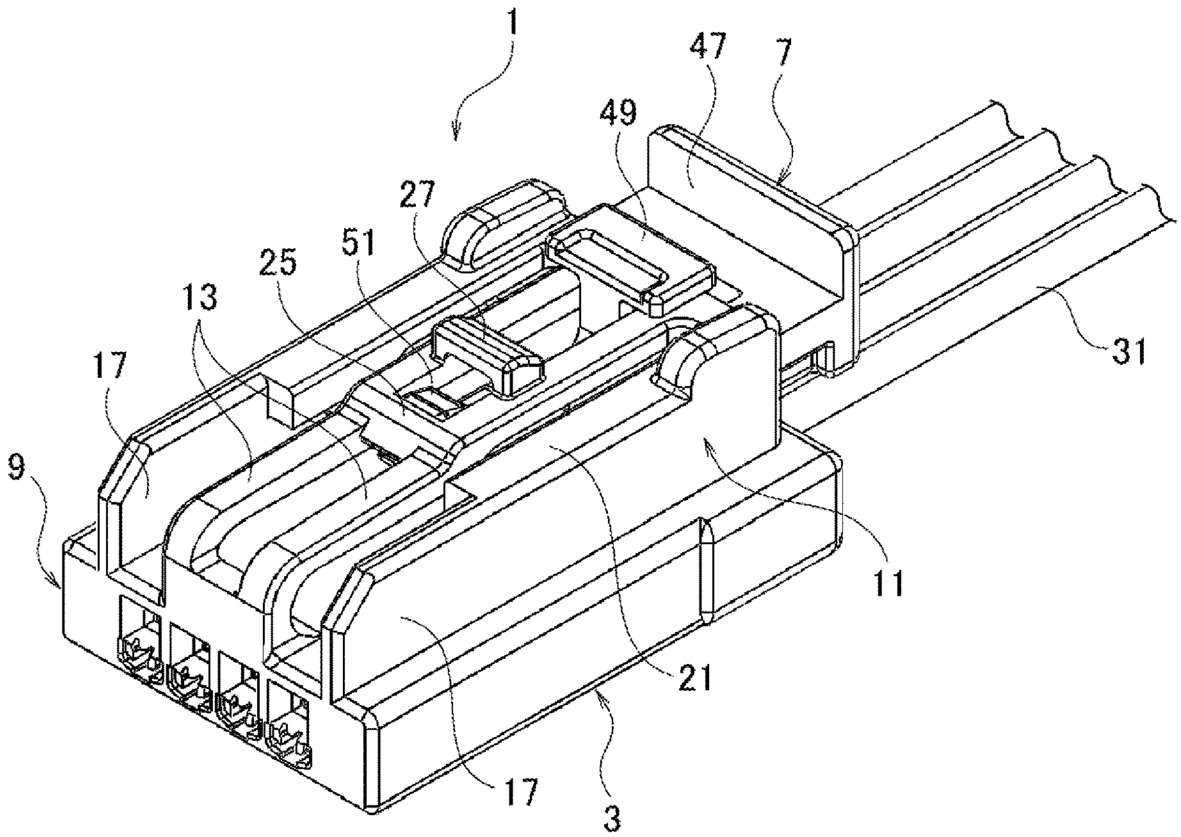
FIG. 1 is a perspective view of a connector in a state where a detection member is in a temporary locking position, according to an embodiment.

Hereinafter, a connector according to an embodiment will be described in detail with reference to the drawings. Note that the dimensional ratios in the drawings are exaggerated for the sake of explanation and may differ from the actual ratios.

As illustrated in FIG. 1, a connector 1 according to the embodiment is electrically connected to one electrical component, such as a power supply or equipment installed in a vehicle. As illustrated in FIGS. 2 to 7, the connector 1 can be fitted with a mating connector 101 electrically connected to the other electrical component. By fitting the connector 1 with the mating connector 101, the connector 1 electrically connect one electrical component with the other electrical component.

As illustrated in FIGS. 2 to 7 and FIG. 10, the mating connector 101 has a mating housing 103 and mating terminals (not illustrated).

The mating housing 103 is made of an insulating material such as synthetic resin. The mating housing 103 is formed into a casing-like shape such that a housing 3 can be fitted in the mating housing 103. The mating housing 103 is formed of a single member continuous to an enclosure 105 which accommodates an electrical component (not illustrated) at one side thereof. The mating housing 103 is extended along a direction in which the mating housing 103 is engaged with or disengaged from the housing 3. The mating housing 103 is opened at the other side thereof. A locked part 107 is mounted to the mating housing 103 at the open side of the mating housing 103 such that the locked part 107 protrudes toward the inside of the mating housing 103.

Each mating terminal is made of conductive material, and is a male terminal with a rod-shaped mating connection part, for example. Each mating terminal is electrically connected to the electrical component in the enclosure 105. Each mating terminal is secured by pressing the mating terminal into a wall part of the enclosure 105, for example, and the mating connection part is located inside the mating housing 103.

As illustrated in FIGS. 1 to 9, the connector 1 includes the housing 3, terminals 5, and a detection member 7. It is noted that one terminal 5 is only illustrated in FIG. 8.

As illustrated in FIGS. 1 to 8, the housing 3 is made of an insulating material such as synthetic resin. The housing 3 is formed into a casing-like shape such that the housing 3 can be fitted in the mating housing 103. The housing 3 includes a terminal receiving part 9, a detection member receiving part 11, and lock arms 13.

The terminal receiving part 9 is located at a lower side in a height direction of the housing 3 and is extended along the direction in which the housing 3 is engaged with or disengaged from the mating housing 103. The interior of the terminal receiving part 9 is divided into a plurality of rows along a width direction of the housing 3. The terminal receiving part 9 receives the terminals 5 in the plurality of rows. The terminal receiving part 9 are opened at both ends thereof in a length direction of the terminal receiving part 9. The mating connection part of each mating terminal is inserted into an opening on one end of the terminal receiving part 9 under a state where the housing 3 and the mating housing 103 are engaged with each other. Each terminal 5 is inserted into an opening on the other end of the terminal receiving part 9. Each engagement lance 15 that is elastically deformable in the height direction of the housing 3 is mounted at a lower side in the interior of the terminal receiving part 9. Each engagement lance 15 is engaged with the corresponding terminal 5, prevents the terminal 5 from being pulled out of the terminal receiving part 9, and holds the terminal 5 in the terminal receiving part 9.

The detection member receiving part 11 is located at an upper side in the height direction of the housing 3. The detection member receiving part 11 has a pair of guide ribs 17, 17 that protrudes upward from the terminal receiving part 9 and is extended along the direction in which the housing 3 is engaged with or disengaged from the mating housing 103. The guide ribs 17, 17 stabilize the movement of the detection member 7 by restraining fluctuations in the width direction in the movement of the detection member 7. Convex portions 19, 19 each of which protrudes from one guide rib 17 toward the other guide rib 17, are respectively mounted to the guide ribs 17, 17 at a lower side of one end in a length direction of the guide ribs 17, 17. Upper guide ribs 21, 21 each of which protrudes from one guide rib 17 toward the other guide rib 17, are respectively mounted to the guide ribs 17, 17 at an upper side of the guide ribs 17, 17. The upper guide ribs 21, 21 are extended along the direction in which the housing 3 is engaged with or disengaged from the mating housing 103. The upper guide ribs 21, 21 stabilize the movement of the detection member 7 by restraining fluctuations in the height direction in the movement of the detection member 7. Restrained portions 23, 23 that protrude downwardly, are respectively mounted to the upper guide ribs 21, 21 at a side opposite to the convex portions 19, 19 in a length direction of the upper guide ribs 21, 21. Each restrained portion 23 is inclined with respect to the direction of movement of the detection member 7. It is noted that one guide rib 17, one convex portion 19, one upper guide rib 21, and one restrained portion 23 are only illustrated in FIG. 8.

The lock arms 13 are located at an upper side in the height direction of the housing 3 and are positioned between the guide ribs 17, 17. The lock arms 13 are extended along the direction in which the housing 3 is engaged with or disengaged from the mating housing 103 and are arranged such that that the lock arms 13 are away from each other in the width direction of the housing 3. In the embodiment, the number of the lock arms 13 is two. Each lock arm 13 has a front side and a rear side in the direction in which the housing 3 is engaged with the mating housing 103 as base ends formed of a single member continuous to the terminal receiving part 9 and the guide ribs 17, 17, and an intermediate part as an elastic deformable part arranged such that the elastic deformable part can elastically be deformed in the height direction of housing 3. A height in a space between the lock arms 13 and the terminal receiving part 9 is set at a height that allows insertion of the detection member 7. The detection member receiving part 11 is formed in the space. The elastic deformable parts of the lock arms 13 are provided with a locking portion 25 that connects the two lock arms 13 such that the two lock arms 13 work together.

When the housing 3 is inserted into the mating housing 103, the lock arms 13 slides such that the locking portion 25 contacts the locked part 107 and then slides over the locked part 107. By the sliding of the locking portion 25 and the locked part 107, the lock arms 13 are elastically deformed toward a lower side of the housing 3 through the locking portion 25. When the housing 3 is received in a regular position in the mating connector 103, the locking portion 25 climbs over the locked part 107. At this time, the lock arms 13 are restored toward an upper side of the housing 3 through the locking portion 25, and the locking portion 25 and the locked part 107 are engaged with each other in the disengagement direction. By the engagement of the locking portion 25 and the locked part 107, the engagement state of the housing 3 and the mating housing 103 is maintained. The elastic deformable parts of the lock arms 13 are provided with a release operating portion 27 that elastically deforms the lock arms 13 downwardly by pressing. By pressing the release operating portion 27 downward, the lock arms 13 are elastically deformed downward to release the engagement state of the locking portion 25 and the locked part 107. By releasing the engagement of the locking portion 25 and the locked part 107, the engagement of the housing 3 and the mating housing 103 can be released.

Figure 8:
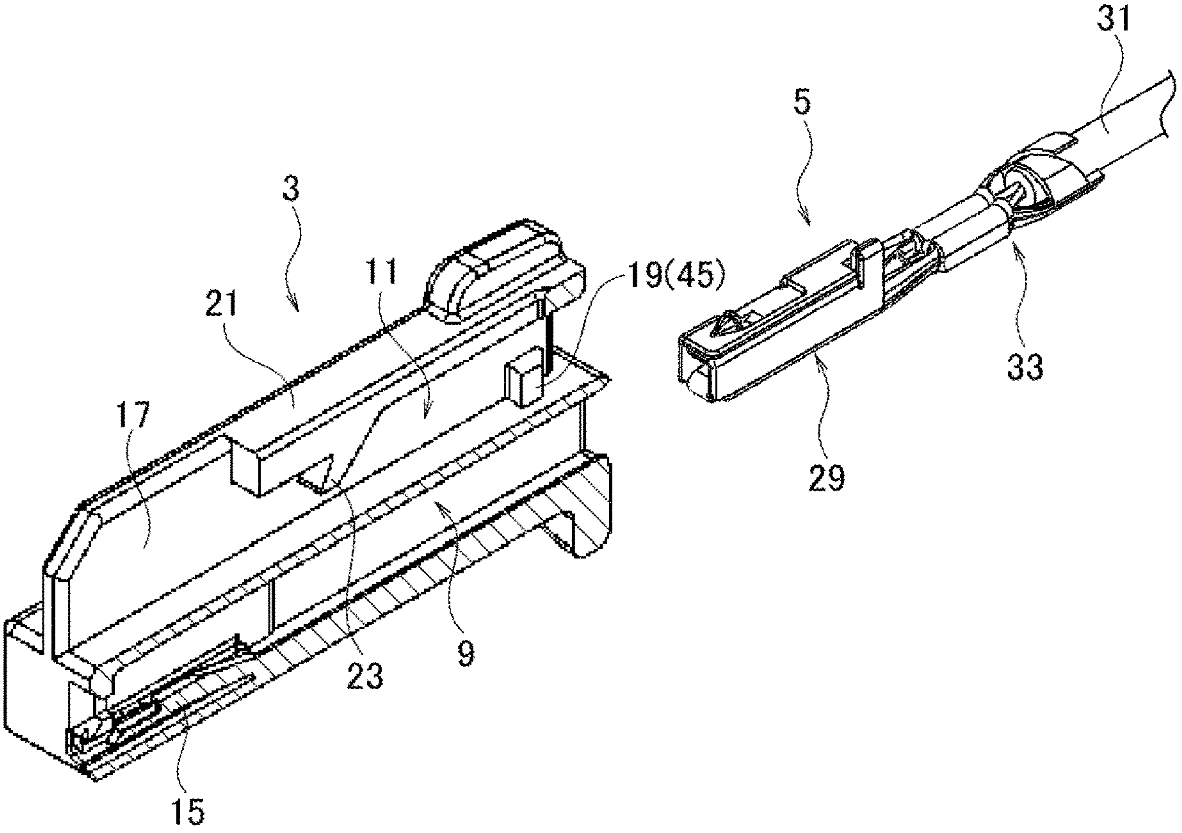
FIG. 8 is a perspective view of a part of a housing and a terminal of the connector according to the embodiment, wherein the part of the housing is illustrated in cross-section.
Figure 9:
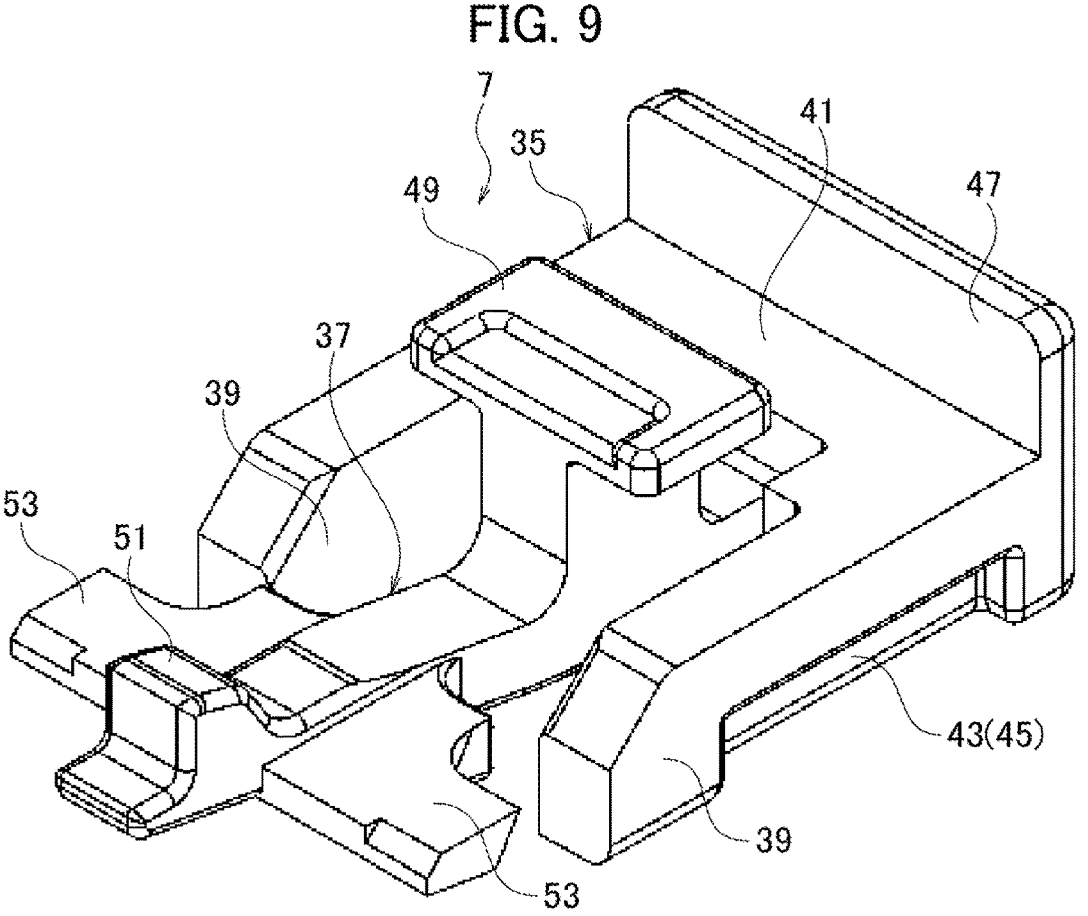
FIG. 9 is a perspective view of the detection member of the connector according to the embodiment.
Figure 10:
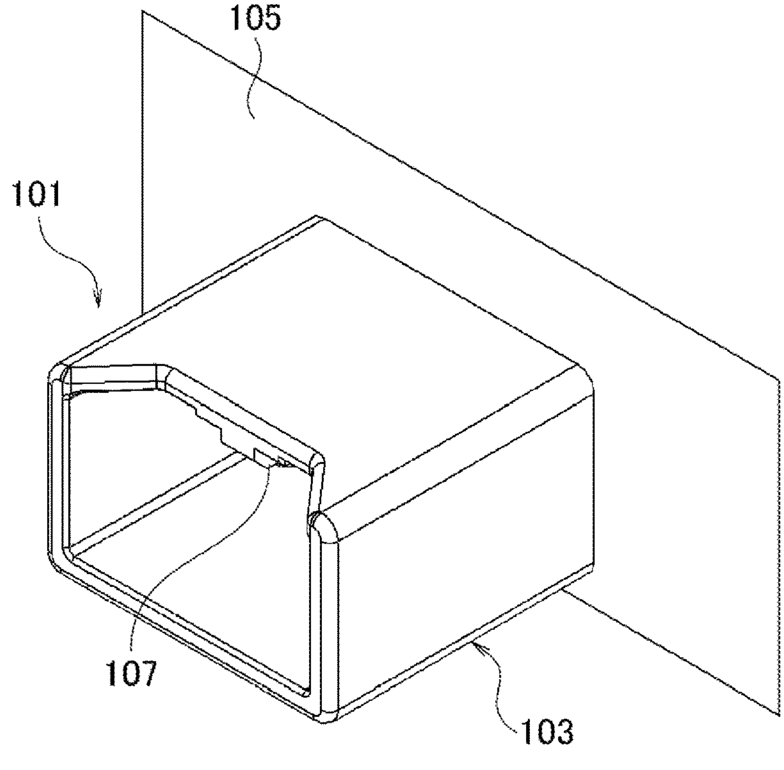
FIG. 10 is a perspective view of a mating connector with which the connector according to the embodiment can be fitted.

As illustrated in FIG. 8, each terminal 5 is made of conductive material, and is a female terminal with a box-shaped connection part 29. In each terminal 5, an electric wire connection portion 33 formed of a single member continuous to the connection part 29 is electrically connected to an end part of an electrical wire 31 electrically connected to an electrical component by crimping, for example. Each terminal 5 is inserted into the terminal receiving part 9 through the opening on the other end of the terminal receiving part 9 and is received in the terminal receiving part 9. Each terminal 5 received in the terminal receiving part 9 is held in the terminal receiving part 9 by engaging the engagement lance 15 to the connection part 29, and the electric wire 31 is drawn out of the housing 3 from the opening on the other end of the terminal receiving part 9. When the housing 3 is engaged with the mating housing 103, the mating connection part of each mating terminal inserted in the terminal receiving part 9 from the opening on one end of the terminal receiving part 9 is inserted in the connection part 29 of each terminal 5. Thus, each terminal 5 is electrically connected to the corresponding mating terminal.

As illustrated in FIGS. 1 to 7 and FIG. 9, the detection member 7 is made of an insulating material such as synthetic resin. The detection member 7 is movably mounted to the housing 3. The detection member 7 can move between the temporary locking position (see FIG. 2) and the final locking position (see FIG. 4) along the direction in which the housing 3 is engaged with or disengaged from the mating housing 103. The detection member 7 is also referred to as a CPA (Connector Position Assurance). The detection member 7 has a main body 35 and a detection locking arm 37.

The main body 35 has a pair of side portions 39, 39 that is extended along the direction of movement of the detection member 7, and a linking portion 41 formed of a single member continuous to the side portions 39, 39 so as to link the side portions 39, 39 at one end of the side portions 39, 39. The side portions 39, 39 and the linking portion 41 are arranged to be received in the detection member receiving part 11 of the housing 3. The main body 35 is arranged in the detection member receiving part 11 of the housing 3 such that the main body 35 can move between the temporary locking position and the final locking position of the detection member 7.

The side portions 39, 39 of the main body 35 are respectively provided with concave portions 43, 43 that are to be engaged with the convex portions 19, 19 of the housing 3. The concave portions 43, 43 and the convex portions 19, 19 constitute a detachment prevention portion 45 that prevents the detection member 7 from falling out of the housing 3. The concave portions 43, 43 are extended along the direction of movement of the detection member 7 and are always engaged with the convex portions 19, 19 while the detection member 7 is moving, which stabilizes the movement of the detection member 7. In the temporary locking position of the detection member 7 (see FIG. 2), one end of each concave portion 43 in the length direction is positioned to face the corresponding convex portion 19 in a direction in which the detection member 7 is detached from the housing 3. Therefore, when the detection member 7 tries to move from the temporary locking position in the direction in which the detection member 7 is detached from the housing 3, the one end of each concave portion 43 is engaged with the corresponding convex portion 19, which prevents the detection member 7 from falling off from the housing 3. It is noted that one concave portion 43 is only illustrated in FIG. 9.

A moving operating portion 47 is provided to the linking portion 41 of the main body 35. The moving operating portion 47 is positioned such that the moving operating portion 47 is exposed from the detection member receiving part 11 of the housing 3. The moving operating portion 47 moves the detection member 7 when the moving operating portion 47 is pressed toward the direction of movement of the detection member 7.

The detection locking arm 37 is formed of a single member continuous to the main body 35 and is disposed between the side portions 39, 39 such that the detection locking arm 37 is away from the side portions 39, 39. The detection locking arm 37 is extended along the direction of movement of the detection member 7. The detection locking arm 37 has a base end at a side of the linking portion 41 formed of the single member continuous to the side portions 39, 39, and a free end at a tip side in an extension direction. Under this configuration, the detection locking arm 37 is elastically deformable in the height direction of the housing 3. An operating portion 49 is formed protruding upwardly at the base end of the detection locking arm 37. The operating portion 49 is disposed between the lock arms 13 such that the operating portion 49 can be moved, and is positioned such that the operating portion 49 is exposed from the detection member receiving part 11 of the housing 3. The operating portion 49 elastically deforms the free end of the detection locking arm 37 downward by pressing the operating portion 49 downward. Therefore, the detection locking arm 37 can be elastically deformed directly by the pressing operation of the operating portion 49. The free end of the detection locking arm 37 is provided with an engaging portion 51 and restraining portions 53, 53.

Figure 2:
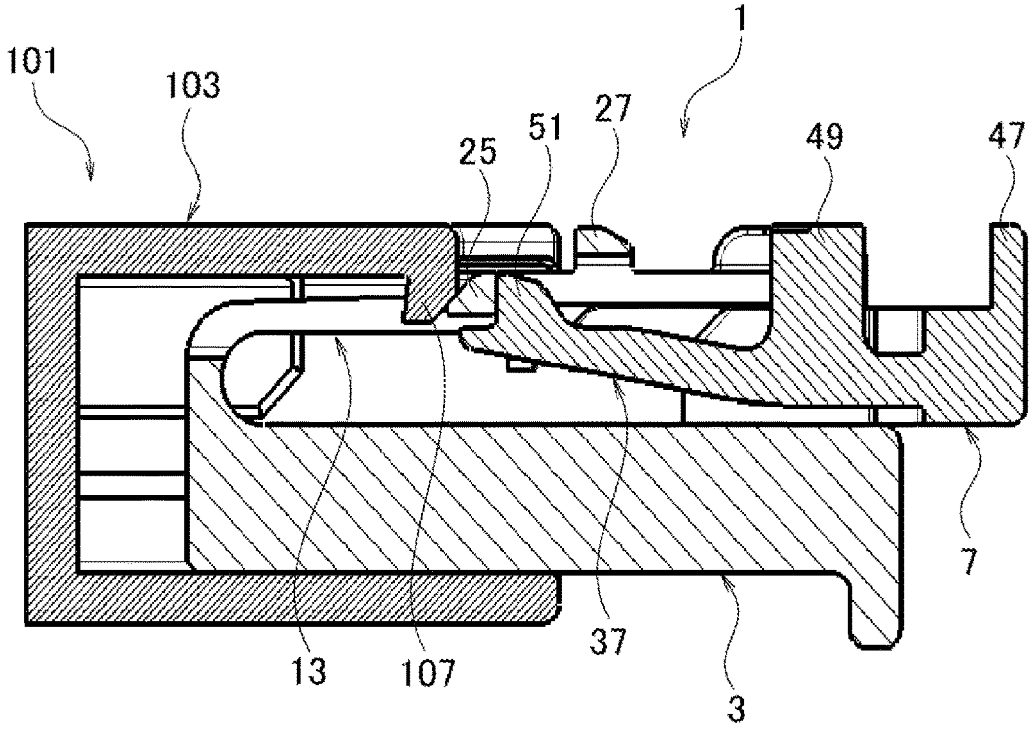
FIG. 2 is a cross-sectional view of the connector in the state where the detection member is in in the temporary locking position, according to the embodiment.

The engaging portion 51 is formed of a single member continuous to the detection locking arm 37, protruding upwardly at the free end of the detection locking arm 37. As illustrated in FIG. 2, the engaging portion 51 is in contact with the locking portion 25 of the lock arms 13 in the temporary locking position of the detection member 7. By the contact of the engaging portion 51 and the locking portion 25, the movement of the detection member 7 from the temporary locking position to the final locking position is regulated. At this time, in the detachment prevention portion 45, the convex portions 19, 19 of the housing 3 are positioned to face one ends of the concave portions 43, 43 of the detection member 7, which prevents the detection member 7 from detaching from the housing 3, and the detection member 7 is held in the temporary locking position. The engaging portion 51 retains contact with the locking portion 25 in a state where the locking portion 25 and the locked part 107 are not engaged with each other in the engagement of the housing 3 and the mating housing 103. Therefore, the detection member 7 cannot move from the temporary locking position to the final locking position and can detect that the housing 3 and the mating housing 103 are not engaged.

Figure 3:
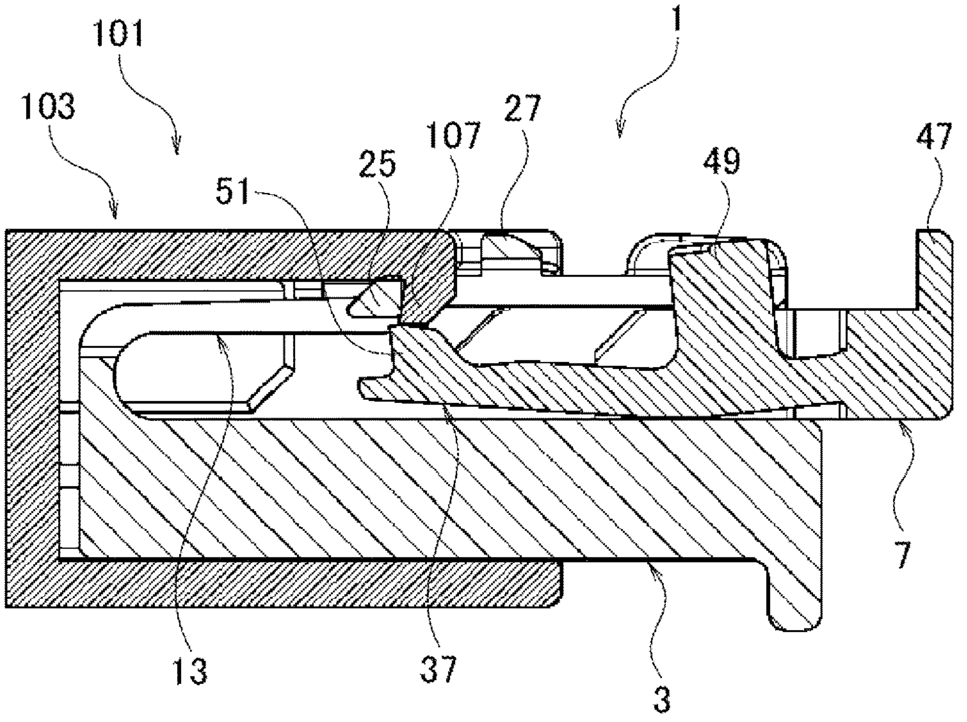
FIG. 3 is a cross-sectional view of the connector in a state where the detection member is in the temporary locking position and a detection locking arm is elastically deformed, according to the embodiment.
Figure 4:
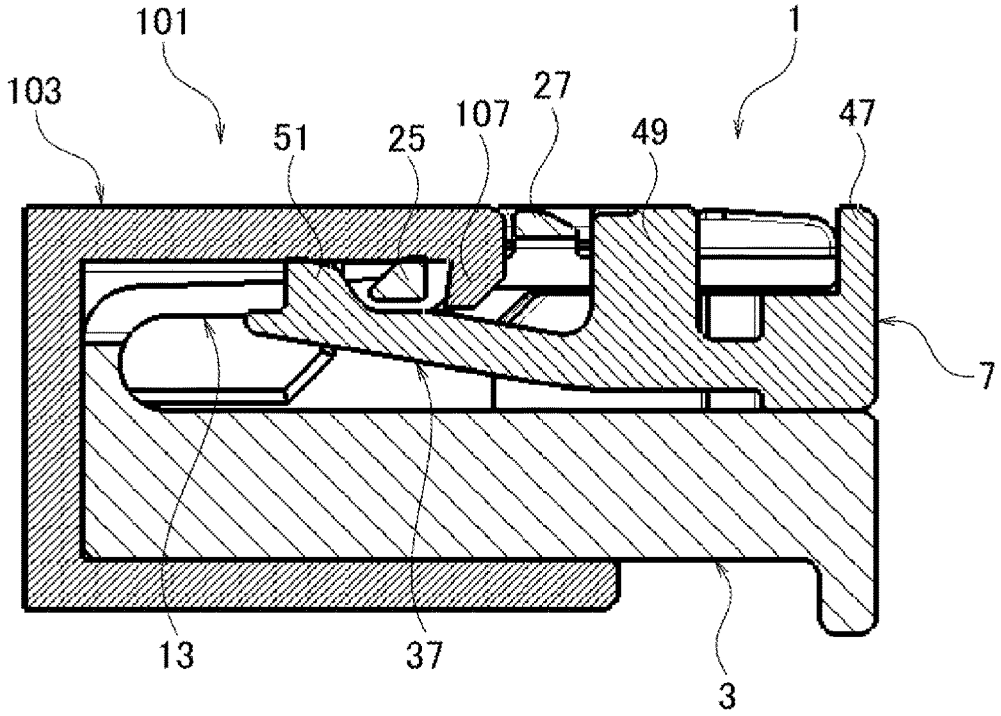
FIG. 4 is a cross-sectional view of the connector in a state where the detection member is in a final locking position and the detection locking arm is restored from elastic deformation, according to the embodiment.

As illustrated in FIG. 3, when the housing 3 and the mating housing 103 are regularly engaged with each other and the locking portion 25 and the locked part 107 are engaged with each other, the engaging portion 51 rides on the locked part 107 and elastically deforms the detection locking arm 37 downward. Therefore, the detection member 7 can move from the temporary locking position to the final locking position, as illustrated in FIG. 4, to detect that the housing 3 and the mating housing 103 are regularly engaged with each other. In the final locking position of the detection member 7, the detection locking arm 37 is restored upward, and the engaging portion 51 is positioned to engageably face the locking portion 25 in the direction of movement to the temporary locking position of the detection member 7, and the final locking position of the detection member 7 is maintained.

When the housing 3 is disengaged from the mating connector 103, it is necessary to move the detection member 7 from the final locking position to the temporary locking position. In the conventional connector, the detection member 7 is held in the final locking position only by the engagement of the engaging portion 51 and locking portion 25. In the conventional connector, by moving the detection member 7 from the final locking position to the temporary locking position, the engaging portion 51 slides on the locking portion 25, which elastically deforms the detection locking arm 37 downward to release the engagement of the engaging portion 51 and the locking portion 25. Therefore, in the conventional connector, when a strong external force is applied to the detection member 7, the detection member 7 may move from the final locking position to the temporary locking position. The detection member 7 that has moved to the temporary locking position protrudes from the end edge of the housing 3 at a side of the temporary locking position (a side of a release direction). If external force is applied to the detection member 7 protruding from the housing 3, there is a possibility that the detection member 7 is damaged. Therefore, the detection member 7 is provided with the restraining portions 53, 53 that restrain the movement of the detection member 7 from the final locking position to the temporary locking position.

The restraining portions 53, 53 are formed of a single member continuous to the detection locking arm 37 at the free end of the detection locking arm 37 and protrudes laterally. The restraining portions 53, 53 are positioned to engageably face the restrained portions 23, 23 of the housing 3 in the direction of movement to the temporary locking position of the detection member 7, in the final locking position of the detection member 7. The restraining portions 53, 53 are engaged with the restrained portions 23, 23 when the detection member 7 tries to move from the final locking position to the temporary locking position. Therefore, even if a strong external force is applied to the detection member 7, the detection member 7 is not moved from the final locking position to the temporary locking position. Thus, the detection member 7 can be stably held in the final locking position. Due to this, in the final locking position, the detection member 7 does not protrude from the end edge of the housing 3 at a side of the temporary locking position (a side of a release direction), in comparison with the conventional connector. Therefore, the detection member 7 can be prevented from being damaged by external forces applied to the detection member 7 protruding from the end edge of the housing 3.

Here, the restrained portions 23, 23 are inclined in the direction of movement of the detection member 7, and are positioned to face the restraining portions 53, 53 in a direction of elastic deformation of the detection locking arm 37. Therefore, in a state where the restraining portions 53, 53 and the restrained portions 23, 23 are engaged with each other, the detection locking arm 37 is not elastically deformed and the engagement of the restraining portions 53, 53 and the restrained portions 23, 23 is not released. The engagement of the restraining portions 53, 53 and the restrained portions 23, 23 can be released by pressing the operating portion 49 downward to elastically deform the detection locking arm 37 downward.

In addition, the restraining portions 53, 53 are located at different positions from the engaging portion 51 at the free end of the detection locking arm 37. If the engaging portion 51 and the restraining portions 53, 53 are located at the same position in the detection locking arm 37, it is necessary to design the engaging portion 51 and the restraining portions 53, 53 in the same position, which makes the connector 1 larger. Therefore, by locating the engaging portion 51 and the restraining portions 53, 53 at different positions in the detection locking arm 37, the engaging portion 51 and the restraining portions 53, 53 can be designed independently at different positions, which reduces the size of the connector 1.

Figure 5:
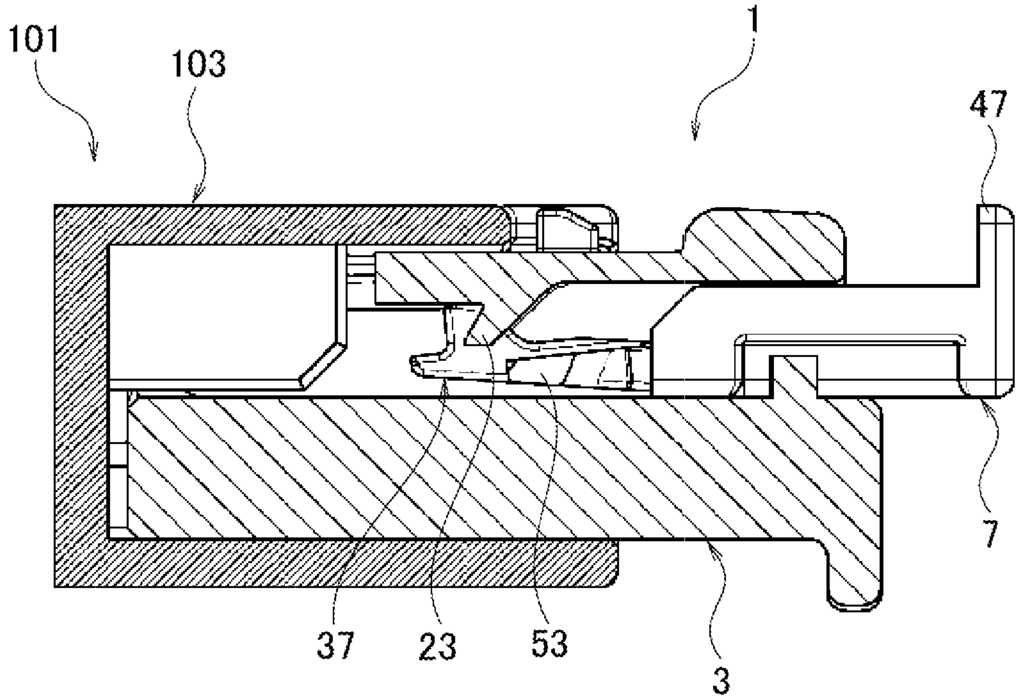
FIG. 5 is a cross-sectional view of the connector in the state where the detection member is in the temporary locking position and the detection locking arm is elastically deformed, according to the embodiment.
Figure 6:
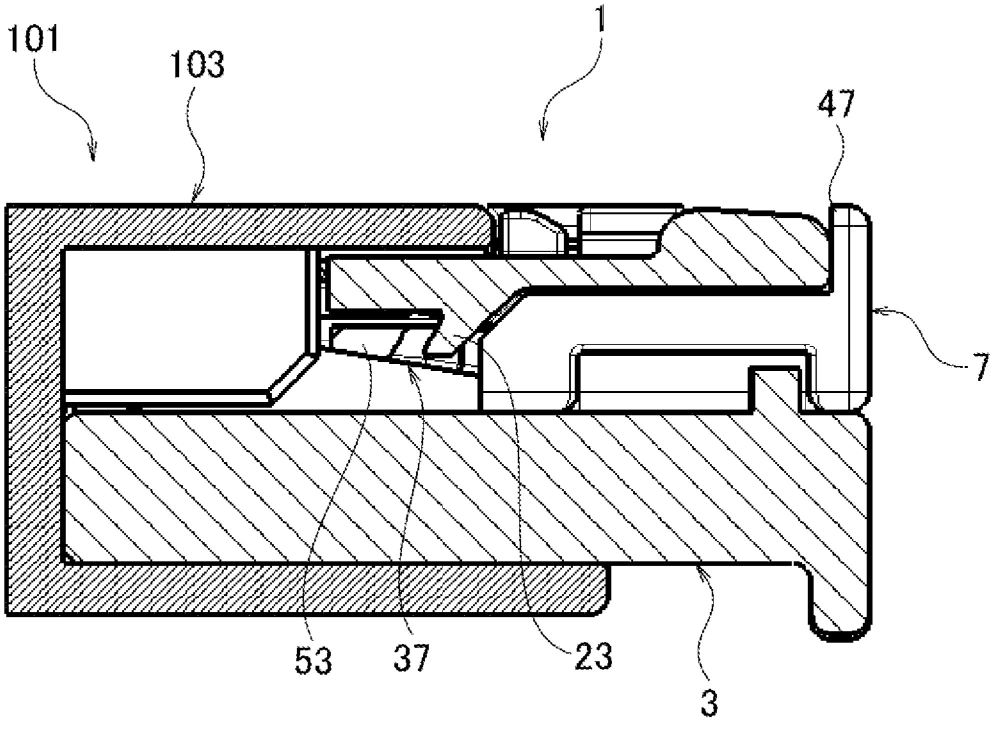
FIG. 6 is a cross-sectional view of the connector in the state where the detection member is in the final locking position and the detection locking arm is restored from the elastic deformation, according to the embodiment.
Figure 7:
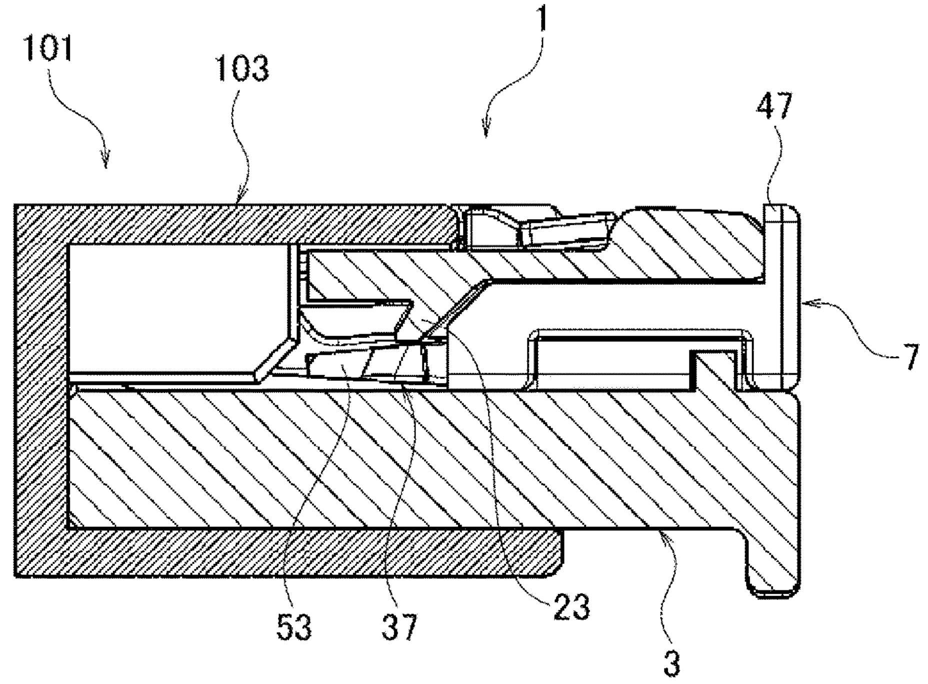
FIG. 7 is a cross-sectional view of the connector in a state where the detection member is in the final locking position and the detection locking arm is elastically deformed, according to the embodiment.

As illustrated in FIG. 5, the restraining portions 53, 53 are positioned below the restrained portions 23, 23 in the temporary locking position of the detection member 7 in a state where the engaging portion 51 rides on the locked part 107 (see FIG. 3) to elastically deform the detection locking arm 37 downward. Thus, the detection member 7 can move from the temporary locking position to the final locking position. As illustrated in FIG. 6, in the final locking position of the detection member 7, the restraining portions 53, 53 are positioned to engageably face the restrained portions 23, 23 in the direction of movement to the temporary locking position of the detection member 7, due to the restoration of the detection locking arm 37 upward. Therefore, the restraining portions 53, 53 are engaged with the restrained portions 23, 23, which prevents the detection member 7 from moving to the temporary locking position by external forces or the like, and the detection member 7 can be stably maintained in the final locking position. As illustrated in FIG. 7, the restraining portions 53, 53 can be disengaged from the restrained portions 23, 23 in the final locking position of the detection member 7 by pressing the operating portion 49 (see FIG. 4) downward to elastically deform the detection locking arm 37 downward. Therefore, the detection member 7 can be easily moved from the final locking position to the temporary locking position by the elastic deformation operation of the detection locking arm 37 by the operating portion 49.

The connector 1 includes the housing 3 that can be engaged with the mating housing 103. The connector 1 includes the detection member 7 that is movably mounted to the housing 3 and detects the engagement state of the mating housing 103 and the housing 3 by moving between the temporary locking position and the final locking position. Furthermore, the housing 3 is provided with the restrained portions 23, 23. The detection member 7 is provided with the restraining portions 53, 53 that is engaged with the restrained portions 23, 23 in the final locking position of the detection member 7 to restrain the movement to the temporary locking position of the detection member 7.

In the final locking position of the detection member 7, even if an external force or the like is applied to the detection member 7, the detection member 7 does not move from the final locking position to the temporary locking position due to the engagement of the restraining portions 53, 53 and the restrained portions 23, 23. Thereby, the detection member 7 can be stably maintained in the final locking position. Therefore, the detection member 7 does not protrude from the housing 3 in the final locking position, which prevents the detection element 7 from being damaged by the external force to be applied to the detection element 7.

Thus, in the connector 1, the detection member 7 can be held in the final locking position by the restrained portions 23, 23 of the housing 3 and the restraining portions 53, 53 of the detection member 7.

The housing 3 is provided with the locking portion 25 that is engaged with the locked part 107 of the mating housing 103 to maintain the engagement state of the mating housing 103 and the housing 3. The detection member 7 is provided with the detection locking arm 37, which is elastically deformable, having the engaging portion 51 that contacts the locking portion 25 in the temporary locking position of the detection member 7 to regulate the movement to the final locking position of the detection member 7. The detection locking arm 37 is elastically deformed to release the contact of the locking portion 25 and the engaging portion 51 in the state where the locked part 107 and the locking portion 25 are engaged with each other. The restraining portions 53, 53 are provided on the detection locking arm 37 and are positioned to be engageable with the restrained portions 23, 23 by restoration of the detection locking arm 37 from the elastic deformation, in the final locking position of the detection member 7.

The restraining portions 53, 53 are mounted to the detection locking arm 37, which is elastically deformed in a state where the locking portion 25 of the housing 3 is engaged with the locked part 107 of the mating housing 103 to maintain the engagement state of the housing 3 and the mating housing 103. In the final locking position of the detection member 7, the restraining portions 53, 53 are positioned to be engageable with the restrained portions 23, 23 by the restoration from the elastic deformation of the detection locking arm 37. Therefore, simply by moving the detection member 7 from the temporary locking position to the final locking position, the restraining portions 53, 53 can be arranged to be engageable with the restrained portions 23, 23.

Further, the detection member 7 is provided with the operating portion 49 that elastically deforms the detection locking arm 37. Therefore, the engagement of the restrained portions 23, 23 and the restraining portions 53, 53 can be released by the elastic deformation operation of the detection locking arm 37 by the operating portion 49, which easily moves the detection member 7 from the final locking position to the temporary locking position.

The restraining portions 53, 53 are located at different positions from the engaging portion 51 in the detection locking arm 37. Therefore, the engaging portion 51 and the restraining portions 53, 53 can be designed independently at different positions in the detection locking arm 37, which reduces the size of the connector 1.

Furthermore, the detachment prevention portion 45 is provided between the housing 3 and the detection member 7. The detachment prevention portion 45 prevents the detection member 7 from moving in a direction in which the detection member 7 is detached from the housing 3, in the temporary locking position of the detection member 7. Therefore, the detection member 7 is prevented from moving from the temporary locking position in the direction in which the detection member 7 is detached from the housing 3, which can stably hold the detection member 7 in the temporary locking position.

Although the present embodiment has been described above, the present embodiment is not limited to these descriptions, and various modifications are possible within the scope of the gist of the present embodiment.

For example, two lock arms are provided in the housing, but the number of the lock arms is not limited to two. One or three or more lock arms may be used. Also, one detection locking arm is provided on the detection member, but the number of the detection locking arms is not limited to one. Two or more detection locking arms may be used. When a plurality of detection locking arms is provided, the detection locking arms can be connected such that the detection locking arms work together.

The direction of movement of the detection member is the same as the direction in which the housing is engaged with or disengaged from the mating housing, but is not limited to this direction. For example, the direction of movement of the detection member may be a direction perpendicular to the direction in which the housing is engaged with or disengaged from the mating housing.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A connector comprising:

a housing that can be engaged with a mating housing; and a detection member that is movably mounted to the housing, and detects an engagement state of the mating housing and the housing by moving between a temporary locking position and a final locking position, wherein the housing is provided with a restrained portion, the detection member is provided with a restraining portion that is engaged with the restrained portion in the final locking position of the detection member to restrain a movement to the temporary locking position of the detection member, the housing is provided with a locking portion that is engaged with a locked part of the mating housing, to maintain the engagement state of the mating housing and the housing, the detection member is provided with a detection locking arm, which is elastically deformable, having an engaging portion that contacts the locking portion in the temporary locking position of the detection member to regulate a movement to the final locking position of the detection member, the detection locking arm is elastically deformed to release a contact of the locking portion and the engaging portion in a state where the locked part and the locking portion are engaged with each other, and the restraining portion is provided on the detection locking arm and is positioned to be engageable with the restrained portion by restoration of the detection locking arm from elastic deformation, in the final locking position of the detection member.

2. The connector according to claim 1, wherein the detection member is provided with an operating portion that elastically deforms the detection locking arm.

3. The connector according to claim 1, wherein the restraining portion is located at a different position from the engaging portion in the detection locking arm.

4. A connector comprising:

a housing that can be engaged with a mating housing; and a detection member that is movably mounted to the housing, and detects an engagement state of the mating housing and the housing by moving between a temporary locking position and a final locking position, wherein the housing is provided with a restrained portion, the detection member is provided with a restraining portion that is engaged with the restrained portion in the final locking position of the detection member to restrain a movement to the temporary locking position of the detection member, and a detachment prevention portion is provided between the housing and the detection member, the detachment prevention portion preventing the detection member from moving in a direction in which the detection member is detached from the housing in the temporary locking position of the detection member.

* * * * *